United States Patent [19]
Girola

[11] 3,802,305
[45] Apr. 9, 1974

[54] TOOL HOLDER TURRET FOR MACHINE TOOLS

[75] Inventor: Aneelo Girola, Busto Arsizio (Varese), Italy

[73] Assignee: Duplomatic-Meccanica Applicazioni Oleodinamiche S.p.A., Busto Arsizio (Varese), Italy

[22] Filed: July 7, 1972

[21] Appl. No.: 269,622

[30] Foreign Application Priority Data
July 8, 1971  Italy.................................. 69310/71

[52] U.S. Cl. ................................. 82/36 A, 29/35.5
[51] Int. Cl. ............................................ B23b 27/00
[58] Field of Search............ 82/36 A, 36 R; 74/813, 74/816, 814, 815, 819; 29/35.5; 82/36 A, 36 R

[56] References Cited
UNITED STATES PATENTS
| | | | |
|---|---|---|---|
| 940,185 | 11/1909 | Norrick | 29/35 |
| 1,502,712 | 7/1924 | Chard | 82/36 |
| 3,283,626 | 11/1966 | Alvey et al. | 82/36 |

*Primary Examiner*—Donald R. Schran
*Assistant Examiner*—W. R. Briggs
*Attorney, Agent, or Firm*—Sughrue, Rothwell, Mion, Zinn & Macpeak

[57] ABSTRACT

A tool holder turret fixed to the movable slide of a machine tool such as a lathe or Universal Copy machine is disclosed. The tool holder turret is adjustable both for angular orientation about a fixed point and also for linear position, in a radial direction with respect to the fixed point, but is adapted so that it can be readily clamped to the movable slide in such a way that, when in operation, the forces exerted on the tool carried by the tool holder turret are not transmitted to the adjustment means, but are transferred directly to the movable slide of the machine tool without affecting the adjustment means so that the adjustment means are not stressed during operation of the machine.

4 Claims, 4 Drawing Figures

TOOL HOLDER TURRET FOR MACHINE TOOLS

BACKGROUND OF THE INVENTION

The present invention relates to a tool holder turret joined to the movable part of a work slide of the type used on machine tools, particularly lathes and Universal Copy machines for lathes.

Tool holder turrets of the type mentioned above are known as such; they are usually assembled on the slide and consist of means for holding back the tools, as well as registering means for varying the reciprocal distance between the tool and the slide. In general the tool is carried by a casing which forms the main part of the turret and which is rotatably mounted upon a terminal board rigidly mounted on the slide, and means for registering the reciprocal distance between the tool and the slide are interposed between the said casing carrying the tool and the said terminal board.

During operation, the stresses to which the tool is subjected are therefore transmitted to the said board, and from this to the slide.

Such known tool holder turrets are generally very complicated as they consist of a large number of parts. This means that they are expensive to manufacture and, moreover, the complexity is structurally disadvantageous in itself.

OBJECTS OF THE INVENTION

One object of this invention is to provide a tool holder turret which is fitted with means for locking the tools and its holder so that the stresses are transmitted directly from the tool holder casing to the slide, so that the arrangement has an enhanced rigidity.

Another object of the invention is to provide a tool holder turret which is constructed using only a relatively small number of parts; this has obvious advantages in performance, practicability in use and maintenance, and also reduces the cost of manufacture.

SUMMARY OF THE INVENTION

According to the present invention, there is provided a tool holder turret for a work slide of a machine tool characterised in that it includes a prismatic element fixed to the slide and movable to different angular positions around a fixed point on the slide, means for fixing the said prismatic element on the slide in a selected angular position, a casing for holding the tools, the casing being slidably mounted and guided by the said prismatic element, means for adjusting the position of the said casing which holds the tool to adjust the position of the tool in a radial direction with respect to the said fixed point on the slide, and means for locking the said casing such that the tools are held directly on to the said slide.

Other features and advantages of the invention will become more apparent during the course of the following description with reference to the accompanying drawings, which is given purely by way of example.

DESCRIPTION OF THE PREFERRED EMBODIMENTS

Figure 1:
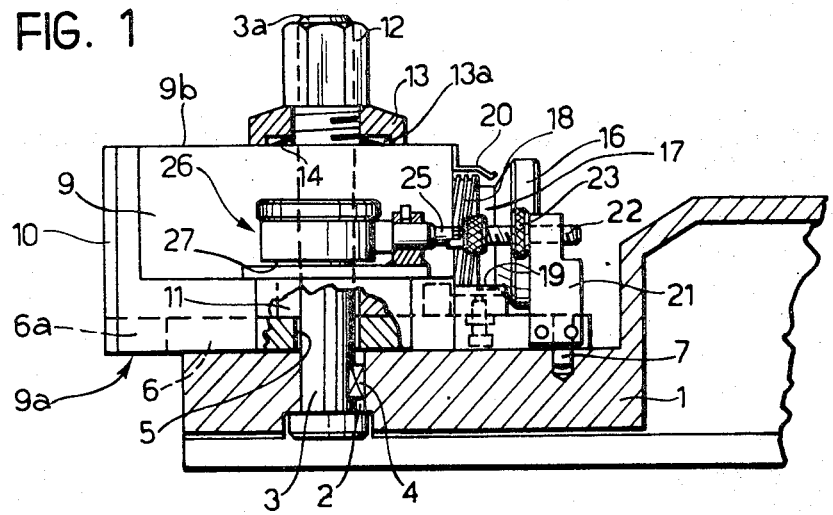
FIG. 1 is a side view, partially in vertical section, of a first embodiment of the invention.
Figure 2:
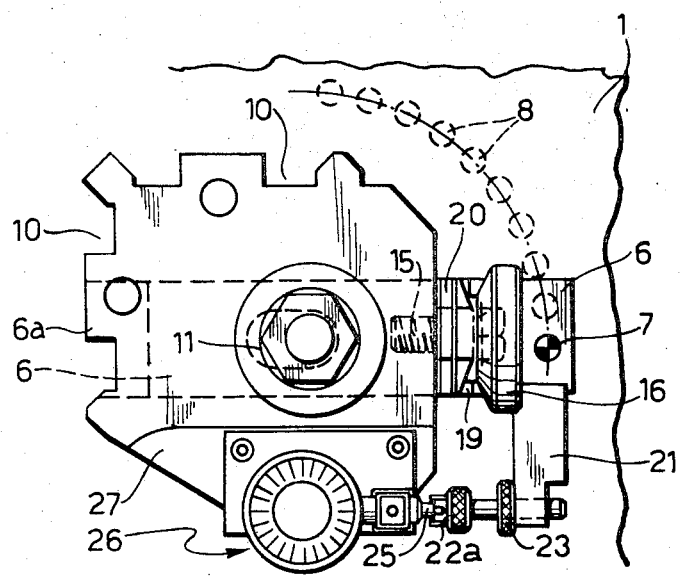
FIG. 2 is a plan view of the embodiment illustrated in FIG. 1.
Figure 3:
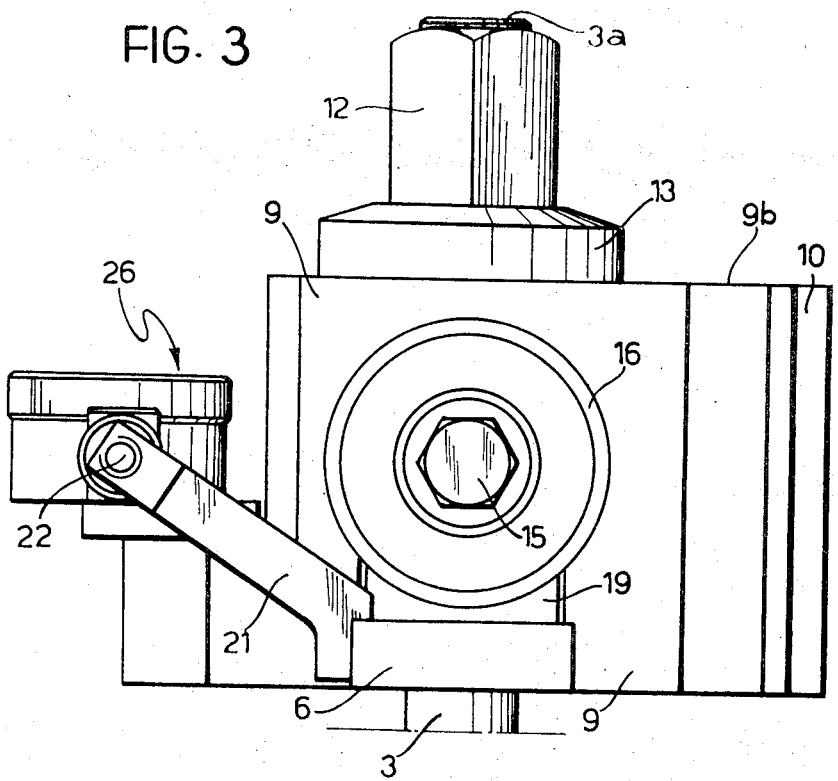
FIG. 3 is a rear view of the embodiment of FIG. 1.

Referring now to the drawings there is shown a slide 1 which may be, for example, the movable part of a Copy machine for a lathe, not illustrated, of the hydraulic type, used on machine tools. On the slide 1 there is a seating 2 for a pin 3 which is restrained rotationally by a cotter 4. To the pin 3, which extends through an aperture 5, there is assembled, with very little play, a prismatic element 6 which rests upon the part 1 of the slide, and the angular position of which can be adjusted by rotating it around the pin 3, and fixed in the chosen angular position by means of a positioning pin 7 which is inserted with very little play into one of a plurality of recesses 8 provided for the purpose upon the portion 1 and located along an arc the centre of which coincides with the axis of the pin 3. Surrounding the prismatic element 6 is a casing 9 which houses the said prismatic element 6, with very little play in the transverse direction, in a corresponding prismatic seating 6a.

The sides 9a of the casing 9 also rest directly upon the portion 1 of the slide. This casing 9 which is adapted to hold the tools of the machine by means of prismatic guides 10 or other similar known means, has a slot 11 extending therethrough. The pin 3 extends through the slot 11 and the upper end 3a thereof is threaded and projects above the casing 9 so as to engage in to a lever nut 12 which presses, by means of a widened element 13, and by means which will be described in greater detail below, upon the upper surface 9b of the casing 9.

The element 13 has a recess 13a and between the surface 9b and the recess 13a there is inserted a flexible washer 14 which keeps the casing 9 resting upon the slide 1. The casing 9 is also provided with a pin 15 rigidly fixed to it, for example by a screw thread, upon the projecting end of which there is assembled a hand grip 16 joined to a part 17 having a screw thread 18 upon part of its periphery.

The thread 18 engages a rack 19 which extends parallel to the axis of the pin 15 and is rigidly fixed to the prismatic element 6. The thread 18 is protected by a cover 20 which may be integral with or mounted on the said casing 9, and which serves to prevent metal shavings or powder from causing wear or damage to the thread 18.

The prismatic element 6 is also provided with a small bracket 21, which bears, at its free end, a threaded hole into which there is inserted a screw 22 which can be locked in any selected position by means of a nut 23. The end 22a of the screw 22 constitutes a plane of reference and the rest of the shaft 25 forms part of a comparator device, of known type, which is generally indicated at 26, and which is assembled on the bracket 27 projecting from the casing 9.

Figure 4:
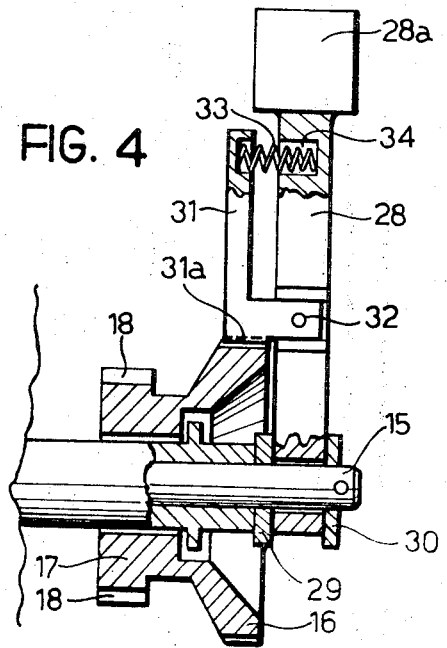
FIG. 4 is a view, partially in section, of a part of a second embodiment of the invention.

Referring now to FIG. 4, which illustrates a second embodiment of the device operating the means for adjusting the position of the tool holder casing in relation to the movable portion of the copier, it should be noted that, on the pin 15, joined to the casing 9 there is assembled a shaft 28, with a handgrip 28a which is rotatable about the pin 15 between two shoulders or washers 29 and 30. The shaft 28 in its turn bears a lever 31 pivoted at 32 and biased by a spring 33 acting between the lever 31 and the shaft 28 which receives it in an appropriate recess 34.

The lever 31 has a right angled elbow 31a and is assembled upon the shaft 28 so that the elbow 31a can engage on to a corresponding peripheral toothing of the handgrip 16 and press upon this under the action of the spring 33.

OPERATION

After having affixed a tool holder to the casing 9 by means of the prismatic guides 10, a first adjustment of position is effected by angularly moving the prismatic element 6 around the pin 3, fixing it in the desired angular position by inserting the pin 7 in one of the recesses 8.

Subsequently, adjustment of the position of the tool in relation to the slide, that is, in relation to the feeler in the case of a Copy machine for a lathe (not illustrated), is effected by means of the hand grip 16 the threaded portion 18 of which causes rectilinear movement of the casing 9 in relation to the prismatic element 6 below it. These movements are detected by the comparator 26 which moves integrally with the casing 9, and whose sensitive shaft 25 reacts upon the fixed reference plane 22a.

During these adjusting movements the lever nut 12 is slackened off so that the element 13 does not engage with the surface 9b of the casing 9. Once the final position of adjustment has been reached, the lever nut 12 is firmly tightened on the pin 3, as a result of which the stresses of the tool pass through the casing 9 and directly on to the portion 1 of the slide without affecting the thread 18 and the rack 19 and also without loading the bar 7 and the coupling 5. In this way the members by means of which the tool's position is adjusted are not involved at all in transmission of the stresses due to the tool's working.

In the second embodiment, shown in FIG. 4, rotation of the handgrip 16 is effected via the shaft 28 and the lever 31. Pressing on the spring 33 disengages the lever 31 from the edge of the handgrip 16 so that the assembly comprising the shaft 28 and the lever 31 can be rotated about the edge of the said handgrip 16 in one direction or the other. When the lever 31 is released this then engages with the edge of the handgrip 16 so that as the said assembly is rotated, the handgrip 16 is also rotated in the desired direction. With this mechanism one can thus readily move the handgrip 16 even in cases in which access to the handgrip is not very easy. Movements of the casing 9 are, again, sensed by the comparator 26.

Naturally the invention can have various different embodiments, for example, locking of the nut 12 can be achieved by eccentric means operated by a lever, or by some equivalent of known type. The dimensions as also the materials can be of any sort according to need, without nevertheless going beyond the scope of the invention as described above and claimed below.

What is claimed is:

1. A tool holder turret for the working slide of a machine tool, said turret comprising an elongate prismatic element, means defining an aperture through said elongate prismatic element,
   a fixed pin on said slide, said fixed pin extending through said prismatic element and having a screw thread at the free end thereof, said prismatic element being turnable about said fixed pin with respect to said slide,
   means locating said prismatic element in selected angular positions about said pin,
   guide means on said prismatic element,
   casing means slidably mounted on said slide and guided by said guide means of said prismatic element to be movable along the longitudinal axis of said prismatic element,
   tool holding means on said casing means,
   means defining an elongate slot through said casing means, said fixed pin extending through said slot in said casing means,
   adjustment means on said prismatic element and said casing means, said adjustment means operating to adjust the position of said casing means with respect to said prismatic element along said guide means on said prismatic element and
   screw threaded clamping means on said threaded end of said fixed pin, said screw threaded clamping means being operable to clamp said casing means directly to said slide in a selected angular and linear position thereof as adjusted by said adjustment means.

2. The tool holder turret of claim 1 wherein said means locating said prismatic element in said selected angular position about said fixed pin on said slide comprise a plurality of recesses in said slide located along an arc the centre of which coincides with the axis of said fixed pin, and a positioning pin joined to said prismatic element, said positioning pin fitting into any selected one of said recesses.

3. The tool holder turret of claim 1 wherein said adjustment means comprise:
   a rack on said prismatic element,
   a screw engaging said rack, said screw being assembled on a pin on said casing for holding the tools, and
   handgrip means on said screw.

4. The tool holder turret of claim 1 including means for recording the movements of the said tool holder casing in relation to said prismatic element, said recording means comprising a comparator on said casing, and a plane of reference on said prismatic element, said comparator engaging against said plane of reference.

* * * * *